Dec. 6, 1966  W. FRANTZ  3,290,670
FLUID PRESSURE OPERATED ACTUATOR
Filed Oct. 15, 1962  3 Sheets-Sheet 1

INVENTOR
WILLIAM FRANTZ
BY Julian C. Renfro
ATTORNEY

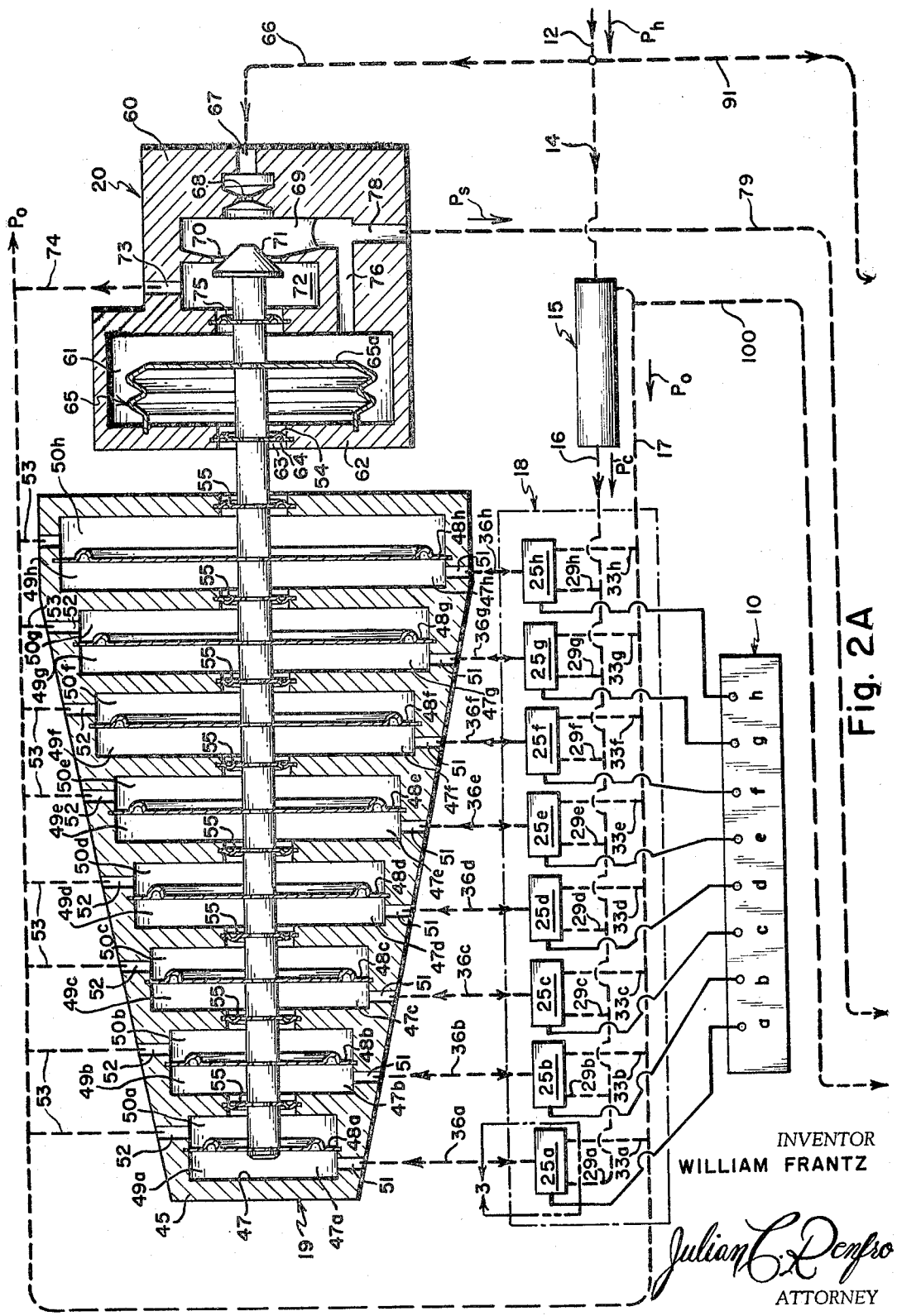

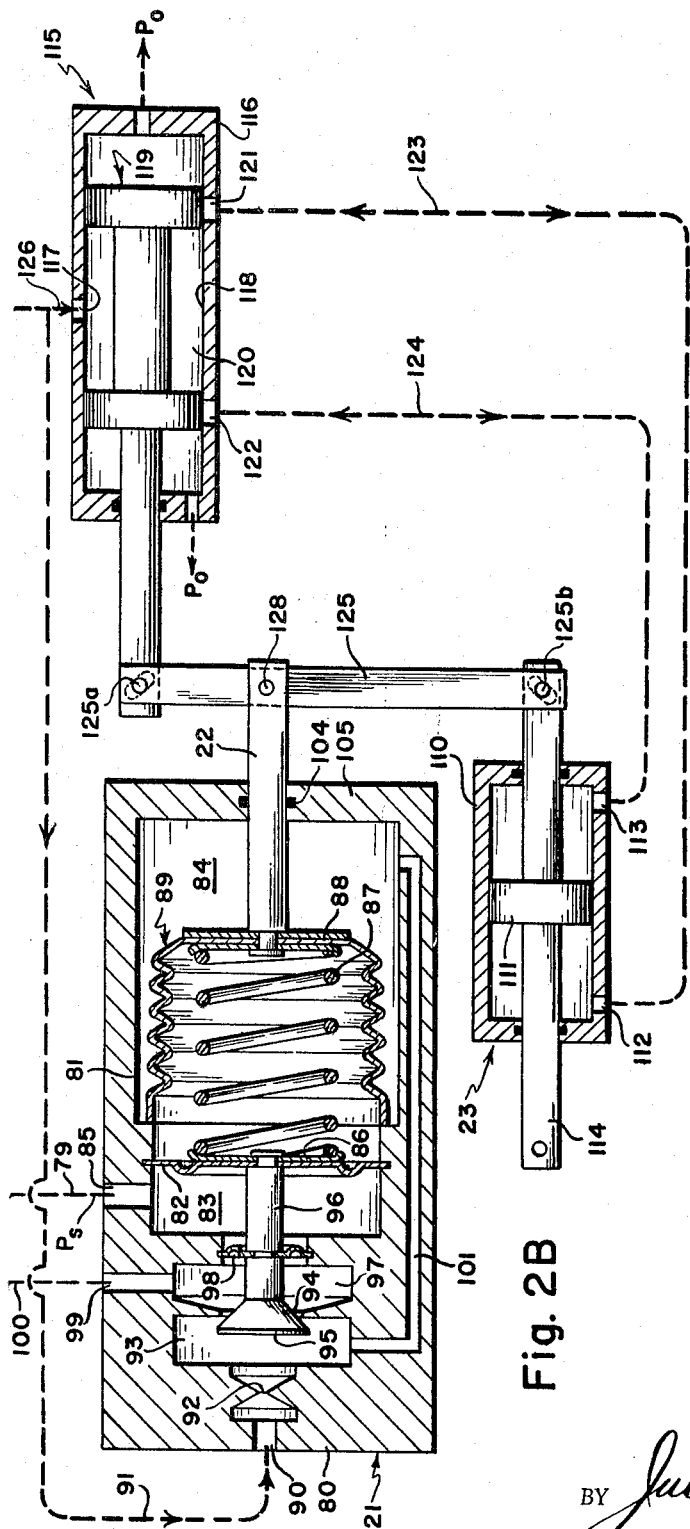

3,290,670
FLUID PRESSURE OPERATED ACTUATOR
William Frantz, Winter Park, Fla., assignor to Martin-Marietta Corporation, Middle River, Md.
Filed Oct. 15, 1962, Ser. No. 230,650
12 Claims. (Cl. 340—347)

My invention relates to digital actuators, and more particularly to novel fluid pressure operated actuator means for converting digital information, for example in the form of binary electrical signals accepted directly from the output of a digital computer, programs means or the like, into corresponding positions of a mechanical element, the element being movable in discrete increments in accordance with the binary signals so as to provide finite displacement by which it is capable of performing useful analog functions.

Certain prior art actuator devices have been proposed which accept binary signals and convert them to mechanical motion through the use of repetitive means employing either a variety of preselected mechanical stops or repeated measured slugs of oil. Other digital actuator devices have been proposed utilizing fluid pressure displacement means such as diaphragms, bellows, pistons, and the like. Repetitive systems are generally limited in that they are not capable of demonstrating the same degree of rapidity in going from one position to each of their other positions, and are subject to cumulative errors requiring complex resetting procedures. In addition, systems utilizing mechanical stops are potentially self-damaging unless the stop structures are made excessively overstrength, while systems utilizing repeated measured slugs of oil are subject to contamination sensitivity, and to accumulated volumetric errors. Moreover, the fluid pressure systems utilizing progressive displacement of pressure responsive means such as diaphragms, bellows, pistons, and the like to effect conversion of digital information directly to motion, are subject to inaccuracies imposed by variations of effective area and resistance to movement of diaphragms and bellows with increases in the strokes thereof, as well as by problems of friction and sealing in the case of pistons.

It is a primary object of this invention to provide an improved fluid pressure operated digital actuator means for converting digital information or signals to mechanical movements with sufficient power for performing useful functions of operating controls, indicators, and the like without recourse to the use of mechanical stops, measured slugs of oil, or the like.

Another object of this invention is to provide an improved fluid pressure operated actuator which relies on balancing of forces to effect digital to analog conversion whereby a minimum of movement of parts such as diaphragms, bellows, and the like, is necessary, thereby resulting in a digital actuator which is simple of construction yet capable of accurate performance over a wide range of output values, and which is self-zeroing when cleared so as to eliminate complex resetting procedures.

This invention has as another object the provision of a novel digital information to motion conversion system, or actuator, which is fully fluid pressure operated and which can perform useful work at locations remote from the source of input information. According to the invention, the digital information is put into the form of binary fluid pressure signals for application to a fluid pressure operated digital to analog means which combines the binary pressure signals in such a manner as to provide a corresponding force which is mechanically applied to a fluid pressure operated transmitter means which develops a corresponding fluid pressure signal. This signal may be conveyed over substantial distances to a remote fluid pressure operated receiver means where response to the pressure signal is manifested by displacement of a receiver output element to positions corresponding to the combined digital input information. The invention further contemplates the use of the motion of the receiver output element as pilot motion to control a fluid pressure operated servo-actuator comprising mechanical feedback for overcoming the friction and load to which the movable element is subjected, as well as to eliminate likelihood of hunting.

Yet another object of my invention is the provision of digital actuator means as described in the foregoing paragraphs wherein the binary pressure signals, the fluid pressure signal from the transmitter means, the pressure fluid utilized in the receiver section to position the output element, and the pressure fluid utilized in the servo-actuator, may all be derived from one source of either compressible or incompressible pressure fluid, or alternatively, one or more of the sections may utilize pressure fluid from different sources whether compressible or not. For example, the pressure fluids used in the digital to analog conversion and in transmitting signals to the receiver may be air or other compressible gas, while the pressure fluids used in the receiver and used in the servo-actuator may advantageously be hydraulic in nature.

In one form of the invention more fully described in the following detailed specification, digital information in the form of binary electrical signals from a number of computor output stations are used to actuate a like number of solenoid operated valves which are connected to a pressure source and are each actuable to provide either of two pressures, thereby converting the signals to binary pressure signals. The valves selectively apply either of the two pressures to diaphragm means corresponding to each station and having effective areas sized progressively in binary ratio. The diaphragm means are preferably arranged in a stack and are connected in series to a force accumulating rod or member so that the member is urged in one direction by an unbalanced force representing an analog value of the digital information. In one example of the invention the system comprises eight diaphragms sized in binary progression and each adapted to be subjected to either of two pressures by eight three-way valves so that 256 combinations of valve positions are available to impose any one of 256 different forces (including zero) tending to move the accumulating rod in one direction. The force tending to move the actuating member, for a given set of binary input signals, is applied to the transmitter section which converts the force into a fluid pressure signal and comprises in effect a pressure regulating valve including pressure responsive means such as a diaphragm or bellows having one side acted upon or loaded by the accumulator member and positionable to control a variable orifice connected in series with a fixed orifice between a regulated pressure source and a reference pressure so as to establish between the orifices a resulting pressure related to the ratio of orifice areas. The resulting pressure is applied to the other side of the pressure responsive means which thereby seeks a balance position in which the resulting pressure may be taken as a fluid pressure analog signal corresponding to the input signals. Because the resulting pressure always acts to balance the otherwise unbalanced force on the accumulator member, the binary sized diaphragms connected thereto only undergo that deflection necessary to control the variable orifice.

The fluid pressure signal is conveyed by suitable tubing to the receiver section which may be remote from the transmitter and it is an additional object of this invention to provide a novel receiver comprising a signal pressure responsive member such as a diaphragm which controls a variable orifice connected in series with a fixed orifice between a regulated pressure supply and a reference pressure so as to establish a pressure between the orifices which is related to the ratio of orifice areas and is applied as a load on the opposite side of the signal pressure responsive diaphragm through a movable wall and a compression spring disposed between the diaphragm and the movable wall. Inasmuch as the balancing load on the signal pressure responsive diaphragm is applied through a compression spring, the length of the spring varies directly with the load and with the signal pressure, and these variations in length may be imposed on a movable output element which is thereby positioned in accordance with the binary signals controlling the three-way valves. Also, the signal pressure responsive diaphragm is always balanced by a loading force equal to the signal pressure and therefore experiences only that deflection necessary to control the variable orifice.

The positioning motion of the element can be used directly as the actuator output without affecting the accuracy of the system or may be utilized as pilot motion for a more powerful fluid pressure operated servo-actuator which preferably comprises a double acting piston positioned in a cylinder by fluid pressure which is selectively directed to one end or the other of the piston by a transfer valve, the position of which is effected both by movement of the receiver output element and by follow-up movement of the servo-acuator piston. The receiver output element is preferably connected to a link between the transfer valve and the piston so as to derive a mechanical feedback from motion of the piston for overcoming the effects of load and friction on the output element of the receiver, and to avoid hunting by the piston.

These and other objects of the invention are achieved by certain constructions and arrangements of parts as will become readily apparent from the following detailed description of a presently preferred example of a digital actuator embodying the invention, read in conjunction with the accompanying sheets of drawings forming a part of this specification, and in which:

FIGS. 2A and 2B illustrate the digital actuator of FIG. 1, schematically showing components thereof in longitudinal section;

FIG. 3 is an enlarged sectional view of a selector valve element of the digital actuator.

Figure 1:
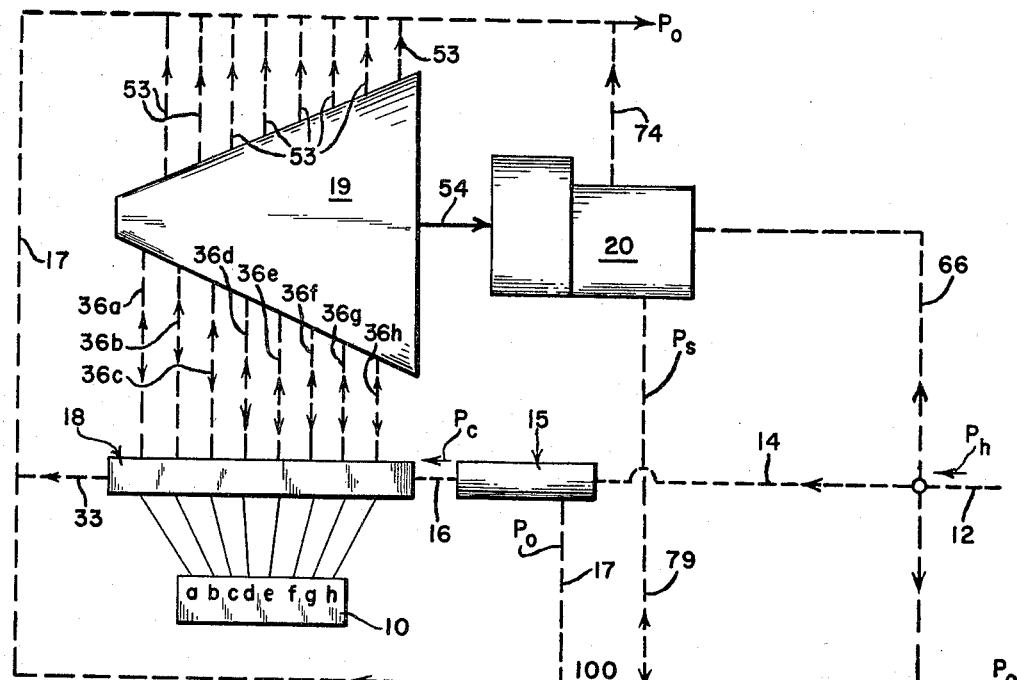
FIG. 1 is a diagrammatic illustration of a fluid pressure operated digital actuator embodying my invention.

Referring to FIG. 1 of the drawings, the reference number 10 represents a digital computer, the output of which is in the form of binary electrical signals at each of eight output stations $a$ through $h$. In the form of the invention described hereinafter there is provided a fluid pressure operated digital actuator system which receives the binary signals directly from computer 10 and, by means of novel constructions and arrangements of parts, positions a mechanical element in accordance with various combinations of the binary signals. The mechanical element is capable of performing useful functions such as indicating, operating valves or other control means, and the like.

The actuator system is supplied with fluid at a relatively high pressure $P_h$ from a suitable regulated source (not shown) through a supply line 12. A portion of the high pressure fluid is passed through a line 14 to a differential throttling valve 15 which provides a constant pressure differential between a line 16 containing fluid at a relatively low regulated control pressure $P_c$, and a drain line 17 containing fluid at a reference pressure $P_o$. In the present example the differential between $P_c$ and $P_o$ is on the order of 20 pounds per square inch. The control pressure and reference pressure lines 16 and 17 are connected to a signal selector section 18 of the system which comprises valve means, later described in more detail, for converting binary electrical signals from the computer 10 into binary pressure signals applied to a diaphragm stack 19. The diaphragm stack 19, also described more fully hereinafter, is in effect a digital to analog conversion section and converts the binary pressure signals into a force factor which is mechanically impressed as an analog signal on a transmitter 20. The latter converts the force factor to a fluid pressure signal $P_s$ which may be transmitted by suitable piping to a remote receiver 21, the output of which is in the form of mechanical motion or positioning of an element or link 22 in accordance with the binary output signals of the computer 10. The output of the receiver 21 may be used directly for the mentioned indicating or controlling purposes, or the motion of link 22 may be utilized as pilot motion for operating a servo-assist means 23 capable of handling loads beyond the strength capabilities of the receiver 21.

Referring now to FIGS. 2A and 3, the signal selector section 18 comprises a plurality of three-way valves denoted as 25a through 25h. A representative one of the valves (25a) is shown in FIG. 3 as including a body 27 having an inlet port 28 connected by a line 29a to the control pressure ($P_c$) line 16 from the differential throttling valve 15, and an outlet port 32 connected by a line 33a to the reference pressure ($P_o$) line 17. The valve body 27 has a third port 35 connected to a line 36a leading to the diaphragm stack 19. The valve body 27 comprises a bore 38 in which is reciprocably mounted a spool type valve member 39 having an annular recess 40 which is always in communication with port 35. The valve member 39 is reciprocable between positions for alternatively placing line 36a in communication with the control pressure line 16 or with the reference pressure line 17 in accordance with energization or deenergization of an actuating solenoid 41. The actuating solenoid 41 of each valve 25a–25h is electrically connected to the respective output station of the computer 10, and the solenoids are energized or deenergized in accordance with presence or absence of signals at those stations. Thus, the valves 25a–25h are "yes-no" devices which are adapted to convert the binary electrical signals of the computer 10 into binary pressure signals comprising either of two predetermined pressures, namely the pressure $P_c$ or the reference pressures $P_o$. It will be understood, of course, that other well known forms of electrically operated three-way valves may be used, and that manually operated valves could be used.

The binary pressure signals are conveyed via the lines 36a–36h to the diaphragm stack 19 for conversion thereby to an analog force. The diaphragm stack 19, best illustrated in FIG. 2A, comprises a body 45 defining a recess 47 having a series of eight axially aligned cavities 47a–47h which are graduated in size, the sizes increasing from left to right as viewed in the drawings. The cavities are each divided by movable wall means, such as diaphragms 48a–48h, so as to provide chambers 49a–49h on the left hand sides of the respective diaphragms and chambers 50a–50h on the right hand sides thereof. The chambers 49a–49h are provided with passages 51 connected to the binary pressure signal transmitting lines 36a–36h, while the chambers 50a–50h are provided with passages 52 connected by lines 53 to the reference pressure line 17.

Since the pressure in each of chambers 50a–50h is always $P_o$, when the valve 25 for a particular station is positioned to connect the chamber 49 with the reference pressure, the effective pressure acting to displace the diaphragm for that station will be $P_o - P_o$ or zero. On the other hand, if the valve for that station is positioned to connect the control pressure $P_c$ with the chamber 49, the effective pressure on the diaphragm of that station will be $P_c + P_o - P_o$, or $P_c$.

The areas of the diaphragms 48a–48h in the stack 19 are sized in binary progression. That is to say, each successive diaphragm has twice the area of the preceding diaphragm. In the present example, the diaphragm 48a has an area of 0.1 square inch, diaphragm 48b has an area of 0.2 square inch, diaphragm 48c has an area of 0.4 square inch, and so on, with diaphragm 48h having an area of 12.8 square inches. The diaphragms are each connected to an axially extending force accumulator rod 54 which accumulates or integrates forces applied thereto by individual ones of the diaphragms in response to pressure changes in the chambers 49a–49h in accordance with the binary output signals of the computer 10 is interpreted by the signal selector section 18. The accumulator rod 54 is provided with suitable flexible seals 55 where it passes through the body 45, and which seals permit substantially frictionless axial movement of the rod. The diaphragms may be considered to be pressure to force conversion means and, because each has a different area and may be subjected to either of two pressures $P_c$ or $P_o$ in chambers 49a–49h while the pressure in chambers 50a–50h remains constant at $P_o$, it will be recognized that there are 256 possible combinations of forces which may be applied by the diaphragms to the accumulator rod 54. The total force which the diaphragms may apply to the accumulator rod tending to move it to the right can be calculated from the following formula wherein F is the unbalanced force in stack 19 urging the rod 54 to the right and $A_1$ is the effective area of diaphragm 48a, (Equation 1)
$$F = [P_c + P_o - P_o]A_1 + [P_c + P_o - P_o]2A_1 + [P_c + P_o - P_o]4A_1$$
or
$$[P_c][\Sigma A] = F$$

The forces exerted by the diaphragms tending to move the accumulator rod 54 to the right are imposed by the rod on the transmitter 20, with the accumulated forces or force factor serving as an analog signal, the value of which changes in accordance with the combination of binary signals received by the signal selector section 18 from the computer 10.

The transmitter 20 comprises a body 60 defining a chamber 61 and having an end wall 62 in which is formed an opening 63 through which the force accumulator rod 54 extends. A flexible seal 64 surrounds the rod 54 in the opening 63 so as to maintain the rod in fluid tight relation with the body 60 while permitting longitudinal movement of the rod. A bellows 65 is secured to the end wall 62 of the body 60 within the chamber 61 and has a movable walls 65a connected to the force accumulator rod 54. The interior of the bellows 65 is preferably evacuated and pressures in chamber 61 will act on the bellows in a direction opposing forces imposed on rod 54 by pressures acting on the diaphragms 48a–48h.

The pressure in chamber 61 is regulated in response to movement of the rod 54 so that the force of bellows 65 just balances the accumulated forces exerted by the diaphragms on the rod in accordance with Equation 1. This is accomplished by supplying the transmitter 20 with pressure $P_h$ from supply line 12 through a line 66 connected to an inlet port 67 which communicates through a fixed orifice 68, with a chamber 69 which is defined between the fixed orifice and a variable orifice 70. The variable orifice 70 is governed by a tapered valve member 71 on the force accumulator rod 54, and communicates with an outlet chamber 72 connected by a passage 73 and line 74 to the reference pressure line 17. A flexible seal 75 permits longitudinal movement of rod 54 and valve member 71 while maintaining fluid tight integrity between chambers 61 and 72.

Because the fixed and variable orifices are connected in series with chamber 69 therebetween, fluid flow therethrough will establish a resulting pressure in the chamber which is related to the ratio of the orifice areas. This relationship is more fully described in my co-pending patent application Serial No. 182,191 entitled, Hydromechanical Memory Apparatus, now Patent No. 3,133,-553. A fluid passage 76 places chamber 69 in communication with chamber 61 and it will be recognized that if the forces exerted on rod 54 by diaphragms 48a–48h exceed the opposing force exerted by bellows 65, the rod 54 and valve member 71 will move slightly to the right tending to close the variable orifice 70 and will effect an increase in pressure in chamber 69 which is transmitted via passage 76 to chamber 61 to counteract the unbalance of forces operating on rod 54. Accordingly, the valve member 71 will seek a balanced position for which a pressure is established in chamber 69 and which corresponds to the binary output signals of computer 10.

A passage 78 from chamber 69 is connected to a line 79 which transmits the pressure from chambers 61 and 69 to the remote receiver 21 as a fluid pressure signal $P_s$ indicative of the force factor created by the diaphragms on the rod 54. Because $P_c$ in Equation 1 is an absolute value it is desirable to reference the transmitter 20 to absolute zero (pressure), and it is for this reason that the bellows 65 is evacuated. The resulting fluid pressure signal $P_s$ obtained from chamber 69 is an absolute pressure which may be calculated from the following equation in which $A_2$ is the effective area of the bellows 65, $$[P_s][A_2] = [P_c][\Sigma A]$$
or
$$[P_s]\left[\frac{P_c}{A_2}\right][\Sigma A] \qquad \text{(Equation 2)}$$

It will be recognized that the system as so far described is a force balance system in which movement of the rod 54 by the pressure effects on the diaphragms 48a–48h are balanced by pressure in chamber 69, and that movements of the rod 54 and valve members 71 are limited to those necessary for valve member 71 to control the orifice 70 and that these movements may be readily held to several thousandths of an inch.

Referring now to FIG. 2B, the receiver 21 comprises a body 80 having a recess 81 in which is disposed a diaphragm 82 so as to divide the recess into chambers 83 and 84. Chamber 83 is provided with a port 85 connected with the signal pressure line 79 so that increases in signal pressure from the transmitter 20 tend to move the diaphragm 82 to the right as viewed in the drawings. The diaphragm 82 comprises a rigid backing plate 86 and is loaded or urged to the left by a compression spring 87 disposed between the backing plate 86 and the movable end wall 88 of an evacuated bellows 89 disposed in chamber 84. Inasmuch as the signal pressure $P_s$ derived from Equation 1 is an absolute value, it is desirable that the receiver 21 be referenced to absolute zero (pressure) and this is the purpose of evacuating the bellows 89.

The diaphragm 82 is adapted to be variably loaded by spring 87 to balance changing signal pressures in chamber 83, the variable loading being effected by pressure changes in chamber 84 acting through bellows 89 to change the effective length of the spring 87. To this end, the receiver 21 is provided with an inlet port 90 connected by a line 91 to the pressure supply line 12. The inlet port 90 communicates, through a fixed orifice 92, with a chamber 93 defined between the fixed orifice and a variable orifice 94 which is governed by a tapered valve member 95 formed on the end of a rod 96 secured to the diagram 82. The variable orifice 94 communicates with a chamber 97 which is isolated from chamber 83 by a flexible seal 98 about rod 96. A passage 99 and a line 100 places the chamber in communication with the reference pressure line 17.

It will be recognized that when a fluid pressure signal entering port 85 increases the pressure in chamber 83, diaphragm 82 will begin to move to the right, as viewed in the drawings, causing valve member 95 to restrict the variable orifice 94 and effect an increase in pressure in chamber 93. A passage 101 communicates between chamber 93 and chamber 84 so that the increased pressure is applied to bellows 89 causing the latter to shorten spring 87 until the load on diaphragm 82 balances the force on the diaphragm effected by the signal pressure in chamber 83. Conversely, a reduction in signal pressure in chamber 83 will cause a deflection of the diaphragm 82 to the left, thereby opening variable orifice 94 and reducing the pressure communicated by passage 101 from chamber 95 to chamber 84 and hence permitting spring 87 to lengthen until the load on spring 82 once again is in balance with the signal pressure in chamber 83. A slight deflection of diaphragm 82 effects a relatively wide range of pressure changes within chamber 84 and accordingly the length of spring 87 is caused to vary substantially in length, inversely with respect to changes in the signal pressure. The changes in length of spring 87 are manifested by movement of the previously mentioned receiver output member in the form of the link 22 connected to end wall 88 of bellows 89 and extending through a suitable seal 104 in the end wall 105 of the receiver body 80. Inasmuch as the bellows changes in the pressure in chamber 83 are balanced by varying the length of spring 87, changes in the loading will be independent of friction or loads acting on the link 22. Accordingly, the receiver output link 22 may be utilized directly for performing analog functions such as operating indicator means, control valves, and the like, without impairing the accuracy or response of the actuator means.

Because it is usually desirable to make the transmitter and receiver portions of actuator devices as compact and light weight as possible for use in aircraft, missiles, and the like, the work which may be accomplished by the receiver output link 22 will be correspondingly limited. Accordingly, the invention contemplates the inclusion in the apparatus of the mentioned servo-actuator 23 which utilizes the motion or positional output of the link 22 as pilot motion. Thus, there is provided a servo-actuator 23 comprising a cylinder 110 containing a piston 111 which is adapted to be driven in one direction by entry of fluid pressure into cylinder 110 through a port 112, and to be driven in the opposite direction by the entry of fluid through a port 113. Movement of the piston 111 is transmitted via the piston rod 114 to any suitable load.

The admission of pressure fluid through ports 112 and 113 is controlled by a transfer valve 115 comprising a body 116 having an inlet port 117 and a bore 118 containing a spool type valve member 119 which has an annular groove 120 in continuous communication with inlet port 117. The valve body comprises two outlet ports 121 and 122 connected by suitable lines 123 and 124 respectively to the cylinder ports 113 and 112, while the inlet port 117 is connected by a line 123 to the fluid pressure supply line 12.

The spool valve member 119 is connected at 125a to one end of a lever 125 which has its other end connected at 125b to the piston rod 114 of the actuator cylinder 110. The receiver output link 22 is pivotally connected to lever 125 between the ends thereof at 128. When the diaphragm 82 is in a balanced condition, the link 122 acts through lever 125 to hold the spool valve member 119 in the illustrated position in which the outlet ports 121 and 122 are closed so that the piston 111 is held in a stationary condition. Movement of receiver output link 22 to the right, in accordance with a decrease in the fluid pressure signal corresponding to the binary output of the computer, will effect movement of the spool member 119 to the right placing inlet port 117 in communication with outlet port 121 and opening port 122 to exhaust so that the fluid pressure will flow through line 123 into passage 112 and effect movement of piston 111 and piston rod 114 to the right. Movement of piston rod 114 to the right causes lever 125 to pivot about connection 128 causing the spool valve member 119 to move toward its normal position. It will be understood that the resulting position of piston 111 and rod 114 will therefore be dependent upon the position of the receiver output link 22, and also that the movement of lever 125 by the piston rod will tend to cancel the load on the output link 22 and hence serve as a mechanical feedback linkage. Movement of the receiver output link 22 to the left to a new position corresponding to the computor output signals will operate the transfer valve 115 to effect movement of the piston 111 and rod 114 to a corresponding new position.

In the foregoing exemplary embodiment of the invention there has been described the use of a closed reference pressure system and the use of evacuated bellows so as to provide a system operating entirely on absolute pressure values. While this is desirable in circumstances wherein various elements of the system, such as the transmitter 20 and the receiver 21, are in remote places having different ambient conditions, the invention also contemplates the use of ambient pressures as the reference value. In such instances, the chambers 50a–50h may be omitted as may the reference pressure line 17, and the bellows 65 and 89 need not be evacuated.

Moreover, the fluid pressures need not all be derived from a single source as is done in the example, nor must the fluid be all hydraulic or all pneumatic. For example, the regulated control pressure fluid ($P_c$) and the signal pressure fluid ($P_s$) can be air or other compressible fluid, while the pressure fluid for operating the servo-assist means 23 can advantageously be incompressible in nature.

In addition, digital actuators embodying the invention may have the valves 25 of the signal selector 18 operated by signals from devices other than the computor 10. For example, programming means utilizing taped or otherwise recorded information may provide the binary signals for operation of the signal selector valves so as to produce desired predetermined positions at the receiver output link 22. Also, other forms of pressure to force converting means may be substituted for the diaphragms 48, bellows 65, and the like. For example, bellows, diaphragms and pistons may be interchanged, although the arrangements described herein are preferred.

Figure 4:
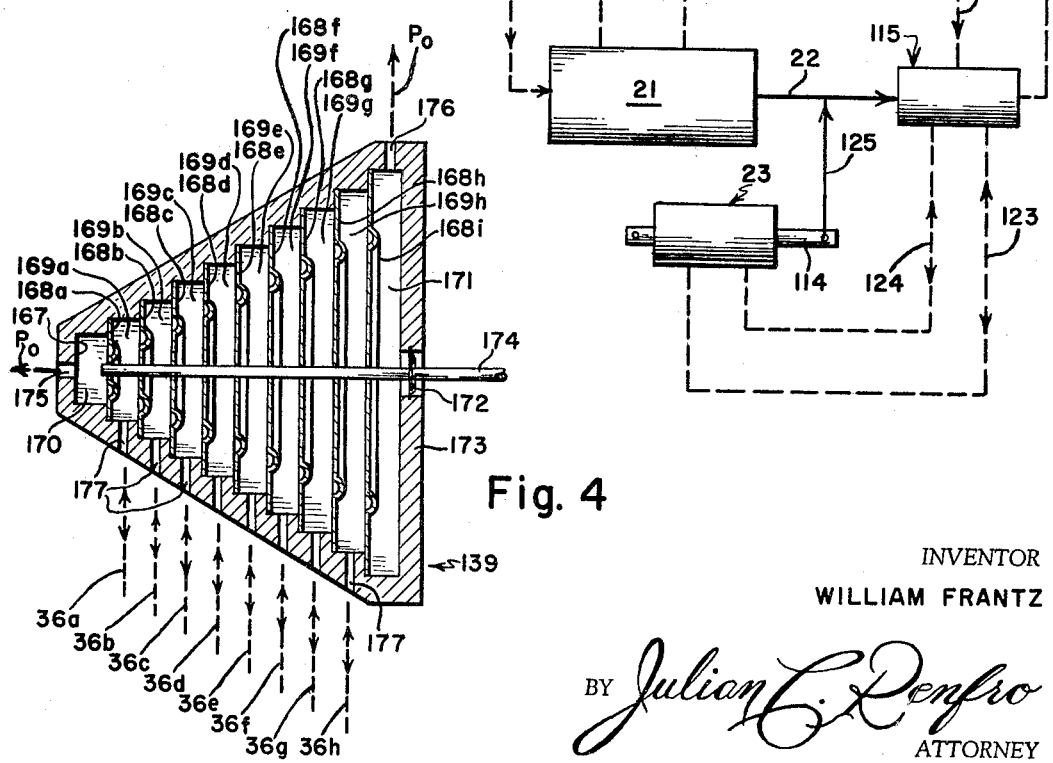
FIG. 4 is a schematic longitudinal section of a modified diaphragm stack component of the actuator.

An alternative form of diaphragm stack 139 illustrated in FIG. 4, may be substituted for diaphragm stack 19 and provides additional advantages of simplicity of construction and elimination of sealing means for the rod 54 between the stations. In this embodiment there is provided a body 165 having a stepped cavity 167 containing a series of nine diaphragms 168a–168i which divide the stepped cavity into a series of eight chambers 169a–169h disposed between end chambers 170 and 171. The diaphragms 168a–168i are sized in binary ratio and are secured to a force accumulating rod 174, corresponding to rod 54 of the preceding embodiment.

The rod 174 extends through a suitable seal 172 in the end wall 173 of the body 165, and is connected to the transmitter 20 in place of rod 54. The end chambers 170 and 171 are provided with passages 175 and 176 connected to the reference pressure ($P_o$) line 17, while the chambers 169a–169h are provided with passages 177 connected to the respective binary pressure signal lines 36a–36h, respectively. Accordingly, each chamber 169a–169h may be subjected to either the reference pressure $P_o$ or the control pressure $P_c$. Of course, the diaphragm stack may have other numbers of diaphragms, and in the present case the nine diaphragms and eight station chambers provide a total of 256 possible force combinations on rod 174.

The unbalanced force F in the diaphragm stack 139 tending to move the rod to the right may be calculated from the following wherein $F_a$, $F_b$, etc. are the forces caused by applied pressure $P_c$ in chambers 169a, 169b, etc., and wherein the area of the smallest diaphragm 168a is denoted by $A_1$ and the area of the largest by $A_x$:

$$F_a + F_b + F_c \ldots F_x + P_o(A_1 - A_x) = F$$

and by substitution:

$$(P_c + P_o)(2A_1 - A_1) + (P_c + P_o)(4A_1 - 2A_1) \ldots$$
$$(P_c + P_o)\left(\frac{A_x}{2}\right) + P_o(A_1 - A_x) = F$$

The force F will be balanced by the creation of a single pressure $P_s$ in the transmitter 20 acting on the bellows 65 having an effective area $A_2$. Accordingly, $$F = P_s A_2$$

or $$P_s = \frac{F}{A_2}$$

The signal pressure $P_s$ is transmitted to the receiver 21 for conversion to mechanical positioning of the link 22 of piston rod 114, all in the manner previously described with reference to the previous embodiment.

Although the invention has been described with reference to particular fluid pressure operated actuator systems embodying the invention, it will be understood that the invention is not limited thereby, but rather the invention includes all those modifications, adaptations, substitutions, and uses as are reasonably embraced by the scope of the claims hereof.

Having described my invention, I claim:

1. A fluid pressure powered actuator for converting digital signals to mechanical movement, said actuator comprising in combination:
   (a) a plurality of fluid pressure to force converting means connected in force producing series to a movable force accumulating member,
   (b) valve means responsive to said digital signals for selectively and jointly applying predetermined pressures to said pressure to force means,
   (c) transmitter means connected to said force accumulating member for producing a fluid pressure signal in accordance with forces exerted by said force accumulating member, said transmitter means including therein pressure responsive means operatively connected to said force accumulating member, latter means being arranged to be subjected to said fluid pressure signal and to deliver on such occasion a force to latter member, the direction of latter force being opposite to the direction of force applied to said force accumulating member by said fluid pressure to force converting means, thus to balance the forces on latter member, and
   (d) receiver means connected to said transmitter and adapted to position an output element in accordance with said pressure signal.

2. An actuator as defined in claim 1 and wherein said pressure to force means are of graduated force output in response to like pressure inputs by said valve means.

3. An actuator as defined in claim 2 and wherein said valve means are adapted to subject said pressure to force means individually and collectively to either of two predetermined pressures, and wherein the output forces of said pressure to force means are graduated in binary ratio.

4. A fluid pressure powered digital actuator for converting binary information at a plurality of stations into finite positions of a mechanical member, said actuator comprising in combination:
   (a) selector means comprising a plurality of valves having means for connection to a fluid pressure source and actuable to provide binary pressure signals corresponding to said information at said stations,
   (b) digital to analog means connected to said selector means and comprising a movable accumulator member, said digital to analog means being responsive to said binary pressure signals to produce a corresponding force factor in said accumulator member,
   (c) transmitter means connected to said accumulator member and comprising fluid conducting means for connection to a fluid pressure source, said transmitter means being conditionable by forces applied by said accumulator member to produce fluid pressure signals corresponding to said forces, said transmitter means including therein pressure responsive means operatively connected to said movable accumulator member, latter means being arranged to be subjected to said fluid pressure signals and to deliver on such occasion a force to latter member, the direction of latter force being opposite to the direction of force applied to said movable accumulator member by said digital to analog means, thus to balance the forces on latter member, and
   (d) receiver means connected to said transmitter means and comprising a movable mechanical output member, said receiver means being responsive to said fluid pressure signals to move said mechanical member to predetermined positions corresponding to said signals.

5. A fluid pressure powered digital actuator for converting binary information at a plurality of stations into finite positions of a mechanical member, said actuator comprising:
   (a) selector means comprising a plurality of valves having means for connection to a fluid pressure source and actuable to provide binary pressure signals corresponding to said information at said stations,
   (b) digital to analog means connected to said selector means and comprising a plurality of pressure to force converting means each corresponding to one of said stations, said pressure to force means comprising a series of pressure responsive movable wall means having effective areas progressively sized in binary ratio and connected to a movable force accumulator member so as to produce accumulator member moving forces corresponding to said binary information,
   (c) transmitter means connected to said accumulator member and comprising fluid conducting means for connection to a fluid pressure source, said transmitter means being conditionable by movement of said accumulator member in response to said forces to produce resulting fluid pressure signals corresponding to said forces, said transmitter means including therein pressure responsive means operatively connected to said movable force accumulator member, latter means being arranged to be subjected to said fluid pressure signals and to deliver on such occasion a force to latter member, the direction of latter force being opposite to the direction of force applied to said movable force accumulator member by said pressure to force converting means, thus to balance the forces on latter member, and
   (d) receiver means connected to said transmitter means and comprising a mechanical output member, said receiver means being responsive to said resulting fluid pressure signals to produce finite positions of said mechanical member corresponding to said binary information.

6. A fluid pressure powered digital actuator for converting binary information at a plurality of stations into finite positions of a mechanical member, said actuator comprising:
   (a) selector means comprising a plurality of valves having means for connection to a fluid pressure source and actuable to provide binary pressure signals corresponding to said information at said stations,
   (b) digital to analog means connected to said selector means and comprising a plurality of pressure to force converting means each corresponding to one of said stations, said pressure to force means comprising a series of pressure responsive movable wall means having effective areas progressively sized in binary ratio and connected to a movable force accumulating member so as to produce accumulator member moving forces corresponding to said binary information, (c) transmitter means comprising fluid conducting means for connection to a pressure fluid source and including first and second orifices connected in series with a chamber therebetween so that fluid flow through said orifices establishes in said chamber a resulting signal pressure related to the ratio of orifice areas, means connected to said accumulator rod for varying one of said orifices to effect changes in said resulting pressure in response to movement of said accumulator member with changes in said binary pressure signals, and pressure responsive means connected to said accumulator member and responsive to said resulting signal pressures to balance said forces on said accumulator member, and (d) receiver means connected to receive said resulting signal pressures from said transmitter and comprising a movable output member, said receiver means being responsive to said resulting fluid pressure signals to move said output member to positions corresponding to said binary information.

7. A fluid pressure powered digital actuator for converting binary information at a plurality of stations into finite positions of a mechanical member, said actuator comprising:

(a) selector means comprising a plurality of valves having means for connection to a fluid pressure source and actuable to provide binary pressure signals corresponding to said information at said stations, (b) digital to analog means connected to said selector means and comprising a plurality of pressure to force converting means each corresponding to one of said stations, said pressure to force means comprising a series of pressure responsive movable wall means having effective areas progressively sized in binary ratio and connected to a movable force accumulating member so as to produce accumulator member moving forces corresponding to said binary information, (c) transmitter means comprising fluid conducting means for connection to a pressure fluid source and including first and second orifices connected in series with a chamber therebetween so that fluid flow through said orifices establishes in said chamber a resulting signal pressure related to the ratio of orifice areas, means connected to said accumulator rod for varying one of said orifices to effect changes in said resulting pressure in response to movement of said accumulator member with changes in said binary pressure signals, and pressure responsive means connected to said accumulator member and responsive to said resulting signal pressures to balance said forces on said accumulator member, and (d) receiver means connected to receive said resulting signal pressures from said transmitter and comprising additional fluid pressure conducting means for connection to a pressure fluid source and including third and fourth orifices connected in series with a second chamber therebetween so that fluid flow through said orifices produces in said second chamber a second resulting pressure related to the ratio of areas of the third and fourth orifices, a second pressure responsive means positionable by said resulting signal pressure acting on one side and loading means acting on the other side so as to vary one of said third and fourth orifices, said loading means comprising resiliently compressible means disposed between said second pressure responsive means and one side of a pressure responsive movable wall means, the other side of said movable wall means being acted upon by said second resulting pressure whereby said movable wall is displaced to vary the load on said second pressure responsive means and cause it to seek a balance position, and a movable output member connected to said movable wall means.

8. A digital to analog means for converting binary pressure signals to corresponding analog pressure output signals, said means comprising:

(a) body means defining a recess, (b) movable wall means dividing said recess into a series of chambers, (c) said body means having passages for directing binary pressure signals to said chambers for acting on said wall means, said movable wall means having effective areas progressively sized in binary ratio, (d) an accumulator member connected to said wall means so as to be subjected to a moving force corresponding to the binary pressure signals applied to said chambers, (e) fluid conducting means for connection between a fluid pressure source and a drain and including first and second orifices connected in series with a chamber therebetween so as to establish in said chamber a resulting signal pressure related to the ratio of orifice areas, (f) orifice restricting means positionable by said accumulator member for varying one of said orifices to increase said signal pressure upon movement of the accumulator member in one direction, and (g) pressure responsive means responsive to said signal pressure to oppose movement of said accumulator member in said one direction, whereby said restricting means seeks a balanced position in which said signal pressure corresponds to the binary pressure signals acting on said movable wall means.

9. Fluid pressure operated receiver for positioning a mechanical member in accordance with a pressure signal, said receiver comprising:

(a) fluid conducting means for connection to a source of pressure fluid, said conducting means including first and second orifices connected in series with a chamber therebetween so that when pressure fluid flows through said orifices a resulting pressure will be established in said chamber related to the ratio of the areas of said orifices, (b) restricting means, positionable to vary the area of one of said orifices, (c) a first movable wall means operative to position said restricting means in response to pressures on opposite sides thereof, (d) fluid conducting means for applying said signal pressure to one side of said first wall means so as to urge said restricting means in a direction tending to increase said resulting pressure.

(e) loading spring means acting against the other side of said first wall means, (f) second movable wall means having one side acting against said loading spring means, and, (g) fluid conducting means for applying said resulting pressure to the other side of said second wall means, whereby said second wall means compresses said spring means against said first wall means to urge the restricting means in a direction tending to decrease said resulting pressure so that said restricting means seeks a balanced position wherein the length of the compressed spring means corresponds to the signal pressure.

10. A fluid pressure powered actuator for converting binary output signals from a computor or the like into finite positions of a mechanical member, said actuator comprising in combination:

(a) selector means comprising a plurality of valves for connection to a source of pressure fluid and responsive to said binary output signals to provide corresponding binary presure signals,
(b) a diaphragm stack comprising a plurality of diaphragms sized in binary ratio to one another,
(c) means connecting said valves to said diaphragm stack whereby said diaphragms may be subjected to said binary pressure signals,
(d) an accumulator member connected to said diaphragms so as to provide a force corresponding to the summation of individual diaphragm forces,
(e) a transmitter connected to said accumulator member and comprising means responsive to changes in said force for establishing a fluid pressure acting to balance said force, and,
(f) means for conducting the last mentioned fluid pressure as a signal pressure to a receiver comprising additional fluid conducting means for connection to a pressure fluid source and including first and second orifices connected in series with a chamber therebetween so that fluid flow through said orifices establishes a resulting pressure in said chamber related to the ratio of orifice areas, signal pressure responsive means for changing the effective size of one of said orifices to produce changes in said resulting pressure corresponding to changes in said signal pressure, said pressure responsive means comprising a first movable wall subjected on one side to said signal pressure, a compression spring acting between the other side of said first wall and one side of a second movable wall, said second movable wall having its other side subjected to said resulting pressure, whereby said resulting pressure acts through said second wall to vary the length of said spring to balance said signal pressure on said first wall, and a mechanical member positionable by movement of said second wall.

11. A fluid pressure powered digital actuator for converting binary information at a plurality of stations into finite positions of a mechanical member, said actuator comprising:
(a) selector means comprising a plurality of valves having means for connection to a fluid pressure source and actuable to provide binary pressure signals corresponding to said information at said stations,
(b) digital to analog means connected to said selector means and comprising a plurality of pressure to force converting means each corresponding to one of said stations, said pressure to force means comprising a series of pressure responsive movable wall means having effective areas progressively sized in binary ratio and connected to a movable force accumulating member so as to produce accumulator member moving forces corresponding to said binary information,
(c) transmitter means connected to said accumulator member and comprising fluid conducting means for connection to a fluid pressure source, said transmitter means being conditionable by movement of said accumulator member in response to said forces to produce resulting fluid pressure signals corresponding to said forces,
(d) receiver means connected to said transmitter means and comprising a mechanical receiver output member, said receiver means being responsive to said resulting fluid pressure signals to produce finite positions of said mechanical member corresponding to said binary information, and,
fluid pressure powered servo-assist means comprising a movable servo output element and actuable by positioning of said receiver output member to provide corresponding positioning of said servo output element, said servo-assist means comprising a mechanical feedback linkage between said servo output element and said receiver output member for applying positive feedback to the latter as the servo output element assumes said corresponding positions.

12. A fluid pressure powered actuator for converting binary output signals from a computor or the like into finite positions of a mechanical member, said actuator comprising in combination:
(a) selector means comprising a plurality of valves for connection to a source of pressure fluid and responsive to said binary output signals to provide corresponding binary pressure signals.
(b) a diaphragm stack comprising a plurality of diaphragms sized in binary ratio to one another,
(c) means connecting said valves to said diaphragm stack whereby said diaphragms may be subjected to said binary pressure signals,
(d) an accumulator member connected to said diaphragms so as to provide a force corresponding to the summation of individual diaphragm forces,
(e) a transmitter connected to said accumulator member and comprising means responsive to changes in said force for establishing a fluid pressure acting to balance said force,
(f) means for conducting the last mentioned fluid pressure as a signal pressure to a receiver comprising additional fluid conducting means for connection to a pressure fluid source and including first and second orifices connected in series with a chamber therebetween so that fluid flow through said orifices establishes a resulting pressure in said chamber related to the ratio of orifice areas, signal pressure responsive means for changing the effective size of one of said orifices to produce changes in said resulting pressure corresponding to changes in said signal pressure, said pressure responsive means comprising a first movable wall subjected on one side to said signal pressure, a compression spring acting between the other side of said first wall and one side of a second movable wall, said second movable wall having its other side subjected to said resulting pressure, whereby said resulting pressure acts through said second wall to vary the length of said spring to balance said signal pressure on said first wall, and a receiver output member positionable by movement of said second wall,
(g) a transfer valve having means for connection to a fluid pressure source and actuable to provide fluid pressure at either of two outlets,
(h) a servo-assist means connected to said outlets and including a servo-output element movable by said fluid pressure in response to actuation of said transfer valve, and,
(i) means connecting said receiver output member to said transfer valve for actuation thereof and connecting said servo-output element to said receiver output member to provide positive feedback thereto.

References Cited by the Examiner
UNITED STATES PATENTS 2,916,205 12/1959 Litz _____ 340—347
3,081,942 3/1963 Maclay _____ 340—347

MAYNARD R. WILBUR, *Primary Examiner.*

MALCOLM A. MORRISON, ROBERT C. BAILEY,
*Examiners.*

W. J. ATKINS, W. J. KOPACZ, *Assistant Examiners.*